Jan. 9, 1940.  G. STEINLEIN  2,186,181
BOWDEN DEVICE BUNDLE
Filed Feb. 8, 1938

Inventor
Gustav Steinlein
by
Deary Fairbank & Hirsch
Attorneys

UNITED STATES PATENT OFFICE 2,186,181

BOWDEN DEVICE BUNDLE

Gustav Steinlein, Mainberg, near Schweinfurt, Germany

Application February 8, 1938, Serial No. 189,421
In Germany February 18, 1937

3 Claims. (Cl. 74—501)

This invention relates to flexible Bowden wires or cables, and more particularly to a fascicular combination of a plurality of Bowden wires, and the invention has for its object to so combine a number of Bowden wires that they form a common transmission set which is adapted to be fastened to the frame of the vehicle at least as far as the single Bowden wires thereof run in the same direction from the point of operation to an engine or other appliances to be operated.

Another object of the invention is to prevent failure of the single Bowden wires in operation and the increase of protection of the traction elements against damage and relative interference of the traction elements.

These objects are attained by collecting and enclosing the several Bowden devices, each composed of a cable or traction member and a sheath or hose enclosing same in a common likewise flexible outer casing or hose. In this casing the Bowden devices are juxtaposed with their own or individual sheaths so that the traction elements are separated from each other. Through this junction the bundle of a number of Bowden devices is also rendered stronger and stiffer against compression; thus every traction member is free to move in its pertinent sheath without rubbing anywhere. A branching member is provided having a main tubular section enclosing an end portion of the casing, and branch sections through which the traction members or cables pass respectively.

This combination of Bowden devices is particularly useful in the case of vehicles, such as motor cycles, where a plurality of Bowden wires are to be conducted towards the engine, brakes, lubricators, illuminating and other appliances. These Bowden wires or cables when separated from one another are difficult to fasten to the vehicle frame and impart a disorderly appearance to the vehicle. Moreover, loops loosely depending in various places are liable to be readily damaged, while bends of the Bowden wire sheath not securely fastened often cause the traction or transmission wire to fail.

In the accompanying drawing, there is shown for purposes of illustration one form of device embodying the invention, in which.

Figure 1:
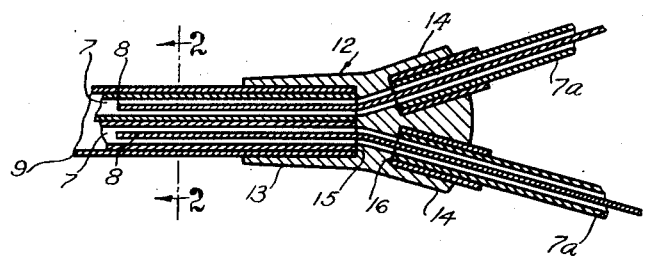
Fig. 1 is a longitudinal section of the device.
Figure 2:
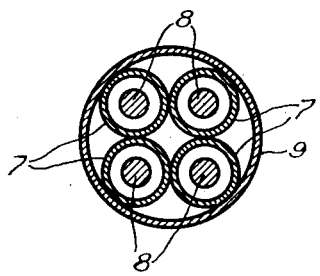
Fig. 2 is a transverse section of the device taken on line 2—2 of Fig. 1.

Referring to the drawing, several Bowden wires each comprising the usual flexible sheath or hose 7 and the pulling or traction wire or cable proper 8 guided therein are enclosed side by side in an external casing 9. Only a short length of this casing 9 is shown in the drawing, but said casing may be as long as the single Bowden wires can be juxtaposed, viz. possibly extend over the whole length thereof.

The casing 9 intended for a plurality of Bowden wires, the pulling wire proper of which is enclosed in its own sheath 7, may be made of textile threads spun or braided around the respective sheaths 7. It is however also possible to make the said casing from metal spirals just as is usual with the sheath 7. When it comprises a fabric made of textile fibres it is preferably rendered waterproof by a varnish coat (not shown) in order that the parts enclosed are protected from rusting. When however a wire spiral is made use of, such an insulation is not usually necessary, since the spirals themselves are fibre covered and varnished. The external casing 9 may be formed around the complete juxtaposed Bowden devices but it may also be made separately and shoved over the Bowden devices.

The external casing 9 may contain any desired number of single Bowden wires, four being shown.

The bundle of Bowden wires is, for instance, conducted from the operating levers of a vehicle to the remote engine and the driving wheel in such a way that the external casing 9 is by means of spring clips fastened along the steering head tube and frame tubes, branching being provided for at the points required.

The Bowden cables or wires 8 are branched off to the various operating mechanisms of the vehicle by means of a branching member 12 made of suitable material such as rubber, and having a main tubular section 13 and branch sections 14, which diverge therefrom, and which have internal duct diameters smaller than the internal duct diameter of said main section. The main section 13 of the branching member encloses an end portion of the casing 9, and presents an end shoulder 15 abutting the enclosed end of said casing. The individual cables 8 passing through the branch sections 14 respectively are enclosed by sheaths 7a corresponding to the sheaths 7. The branch sections 14 enclose these sheaths 7a, and present at their inner ends shoulders 16 abutting the enclosed ends of said sheaths 7a.

I claim:

1. A Bowden device comprising a plurality of cables, sheaths enclosing said cables respectively, an outer casing uniting and enclosing said sheaths, and a branching member having a main tubular section and a pair of branch sections diverging therefrom and of smaller cross-sections, said main section enclosing an end portion of said casing, and presenting a shoulder at its inner end abutting the enclosed ends of said casing and said sheaths, and said cables passing through said branch sections respectively.

2. A Bowden device comprising a plurality of cables, a set of sheaths enclosing said cables respectively, a second set of sheaths enclosing said cables respectively at a section spaced longitudinally from said first set, an outer casing uniting and enclosing said first set of sheaths, and a branching member having a main tubular section enclosing one end of said casing, and a pair of diverging tubular branch sections diverging from said main section and enclosing said second set of sheaths.

3. A Bowden device comprising a plurality of cables, a set of sheaths enclosing said cables respectively, a second set of sheaths enclosing said cables respectively at a section spaced longitudinally from said first set, an outer casing uniting and enclosing said first set of sheaths, and a branching member having a main tubular section and a pair of branching sections diverging therefrom and of smaller cross-sections, said main section enclosing an end portion of said casing, and presenting a shoulder at its inner end abutting the enclosed ends of said casing and said first set of sheaths, and said branch sections enclosing said second set of sheaths respectively, and presenting at their inner ends respectively shoulders abutting the enclosed ends of said second set of sheaths.

GUSTAV STEINLEIN.